United States Patent
Tajiri et al.

(10) Patent No.: US 6,251,010 B1
(45) Date of Patent: Jun. 26, 2001

(54) GAME MACHINE APPARATUS AND METHOD WITH ENHANCED TIME-RELATED DISPLAY OF POKEMON-TYPE CHARACTERS

(75) Inventors: Satoshi Tajiri, Setagaya-ku; Tsunekazu Ishihara, Chuo-ku, both of (JP)

(73) Assignees: Nintendo Co., Ltd.,, Kyoto; Game Freak Inc.; Creatures Inc., both of Tokyo (JP)

( * ) Notice: Subject to any disclaimer, the term of this patent is extended or adjusted under 35 U.S.C. 154(b) by 0 days.

(21) Appl. No.: 09/573,200

(22) Filed: May 18, 2000

(30) Foreign Application Priority Data

Aug. 26, 1999 (JP) .................................................. 11-283279
Nov. 19, 1999 (JP) .................................................. 11-330284

(51) Int. Cl.⁷ .................................................. A63F 13/00
(52) U.S. Cl. .................................................. 463/1; 463/43
(58) Field of Search .................................... 463/1, 23, 29, 463/30, 31, 43; 273/148.03

(56) References Cited

U.S. PATENT DOCUMENTS

| | | |
|---|---|---|
| Re. 34,728 | 9/1994 | Hall-Tipping . |
| Re. 36,675 | 4/2000 | Yamamoto et al. . |
| 4,180,805 | 12/1979 | Burson . |
| 5,065,414 | 11/1991 | Endou et al. . |
| 5,265,888 | 11/1993 | Yamamoto et al. . |
| 5,267,734 | 12/1993 | Stamper et al. . |
| 5,370,399 | 12/1994 | Liverance . |
| 5,390,937 | 2/1995 | Sakaguchi et al. . |
| 5,498,002 | 3/1996 | Gechter . |
| 5,645,513 | 7/1997 | Haydocy et al. . |
| 5,649,862 | 7/1997 | Sakaguchi et al. . |
| 5,746,656 | 5/1998 | Bezick et al. . |
| 5,807,174 | 9/1998 | Fukuhara et al. . |
| 5,810,665 | 9/1998 | Takemoto et al. . |
| 5,833,536 | 11/1998 | Davids et al. . |
| 5,833,540 | 11/1998 | Miodunski et al. . |
| 5,855,512 | 1/1999 | Aoyama et al. . |
| 5,885,156 | 3/1999 | Toyohara et al. . |
| 5,935,003 | 8/1999 | Stephens et al. . |
| 5,947,868 | 9/1999 | Dugan . |
| 5,956,685 | 7/1999 | Tenpaku et al. . |
| 5,999,622 | 12/1999 | Yasukawa et al. . |
| 6,022,274 | 2/2000 | Takeda et al. . |
| 6,039,648 | 3/2000 | Guinn et al. . |
| 6,115,036 | 9/2000 | Yamato et al. . |
| 6,117,009 | 9/2000 | Yoseloff . |

FOREIGN PATENT DOCUMENTS

| | | |
|---|---|---|
| 1-107187 | 4/1989 | (JP) . |
| 6-218088 | 8/1994 | (JP) . |
| 7-181056 | 7/1995 | (JP) . |
| 8-103568 | 4/1996 | (JP) . |

(List continued on next page.)

OTHER PUBLICATIONS

Bishop, David, "Little Computer People", Computer and Video Games, 1985.

Bartimo, Jim, "Q&A: David Crane", p84, Info World, Mar. 12, 1984.

Advertisement, "Who's living in your computer? It's me!", p. 62, Commodore Computing, Dec. 1985.

(List continued on next page.)

Primary Examiner—Michael O'Neill
(74) Attorney, Agent, or Firm—Nixon & Vanderhye P.C.

(57) ABSTRACT

A game machine of a type that a player object is moved on a map to encounter with a character includes a program storage storing a game program, a clock at least clocking a time, an operation device for operating the player object, and an image processor for varying a display image based on the operation of the operation device. The game program storage stores a program for varying an appearance condition of the character appearing on the game map based on time information of the clock.

13 Claims, 13 Drawing Sheets

FOREIGN PATENT DOCUMENTS

| | | |
|---|---|---|
| 8-84894 | 4/1996 | (JP) . |
| 8-224349 | 9/1996 | (JP) . |
| 9-146566 | 6/1997 | (JP) . |
| 9-155064 | 6/1997 | (JP) . |
| 10-277262 | 10/1998 | (JP) . |
| 11-109844 | 4/1999 | (JP) . |
| 11-99276 | 4/1999 | (JP) . |
| 11-179055 | 7/1999 | (JP) . |
| 11-299988 | 11/1999 | (JP) . |
| 11-309273 | 11/1999 | (JP) . |
| WO 98/14898 | 4/1998 | (WO) . |

OTHER PUBLICATIONS

Kristiansen, Rasmus Kirkegard, "The Little Computer People–Hvor Kommer De Fra?", pp. 4–7, SOFT, Jan.–Feb./1986 (with translation).
Advertisement, "Unitsoft Distribution", Computer and Video Games, May 1986.
Mason Ralph, Little Computer People: Research Project, Win 64 Emulator (copyright), 1995.
Crane, David and Nelson, Sam, "Little Computer People", Activism, 1986.
Activision's Modern Computer People: human–like beings actually found living inside computers, (Activision, Mountain View, CA), pp. 1–12, 1985.
Advertisement, Little Computer People Discovery Kit, (Activision, Software, Mountain View, CA), 1985, 1986.
A Computer Owner's Guide to Care of and Communication with Little Computer People, (Activision, Mountain View, CA), 1985.
Activision Catalog, (Activision, Mountain View, CA), 1985.
InfoWorld, 1986.
Ryan, Bob, Dr. Floyd's Desktop Toys (MicroProse Entertainment Pack vol.1), McGraw Hill, Apr. 1993.
"Turn Up the Heat This Holiday Season With Nine Sizzling Games From Activision", PR Neswire Association, Dec. 7, 1995.
Jones, George, "MechWarriors mass for Network attack; new Net–Mech action game from Activision", Nov. 1995.
Tamagotchi Instructions, Bandai, 1996–1997.
Kantrowitz, Barbara and Namuth, Tessa, "A New Pet Rock for The Digital Generation", NEWSWEEK, Jun. 9, 1997.
Lawson, Carol, "Love it, feed it, mourn it", New York Times, May 22, 1997.
Asahi National Broadcasting, "Tamapitchi Takes Off", Jun. 15, 1997.
Scheyen, Peter, "Border Zone", Overview, Feb. 6, 1996.
Waijers, Boudewijn, "The Rougelike Games Home Page", May 13, 1996.
Waijers, Boudewijn, "The Rogue Home Page", Feb. 28, 1996.
Doherty, Paul David, "Infocom Fact Sheet", Sep. 3, 1995.
"Drawings on Napkins, Video Game Animation, and Other Ways to Program Computers", Ken Khan, Information Access Company and Association for Computing Machinery, vol.39, No.8, p. 49, Aug. 1996.
May, Scott, "We Need to Distinugish Ourselves From Edutainment", IDG Commucications, inc., InfoWorld, Aug. 13, 1984.
"C User's Journal", Apr. 1992.
PC Magazine, Oct. 2, 1984.
Gavin, Maurice, "The Hally Orrery: A program to show the comet's orbit", pp. 64–66, *New Scientists, Spotters–Guide, Halley's Comet*, London England, 1985.
Master–Type–Rocky's Boots.
Border Zone: A Game of Intrigue.
"Time and Date in NetHack", Boudewijn Wayers.
The NetHack Home Page, Boudewijn Wayers, Jul. 12, 1996.
Press Release, "Activism 'Little Computer People' Project: Research Update", Activism, Mountain View, California, Jul. 12, 1985.
Emery, Jr., C. Eugene, "Who's the little guy in there?" *Knickerbocker News*, p. 22 Albany, New York, Dec. 16, 1985.
Advertisement, "We're learning to love the little people who live inside computers", USA TODAY, Nov. 11, 1985.
Mulloy, Mike, "David, dog, and others live inside computers", Maywood Herald, Oak Park, Illinois, Jan. 29, 1986.
Katz, Arnie, "The Little Computer People Project", pp. 47–49, AHOY!, 03/86.
Research Update: Activism, "Little Computer People" Project, p. 9, Computer Entertainer, 8/85.
Pokémon Pikachu packaging, Model No.: MPG–001, Nintendo of America Inc., 1998, 4 pages.
Tamagotchi Virtual Pet instructions, 6 pages, Bandai, 1996–1997.
Kantrowitz et al., Newsweek, p. 62, Jun. 9, 1997.
Lawson, New York Times, May 22, 1997.

Fig. 3

| Time Zone | Appearance Probability | Level | Pokemon Number | Pokemon Pointer | Individual Appearance Probability |
|---|---|---|---|---|---|
| Morning | A | LV1:006 | PN1:069 | B1:30 | 30% (Bellsprout) |
| | | LV2:004 | PN2:023 | B2:60 | 30% (Ekans) |
| | | LV3:006 | PN3:179 | B3:80 | 20% (Merriep) |
| | | LV4:006 | PN4:187 | B4:90 | 10% (Hanecco) |
| | | LV5:006 | PN5:019 | B5:95 | 5% (Rattata) |
| | | LV6:004 | PN6:041 | B6:99 | 4% (Zubat) |
| | | LV7:004 | PN7:041 | B7:100 | 1% (Zubat) |

| Time Zone | Appearance Probability | Level | Pokemon Number | Pokemon Pointer | Individual Appearance Probability |
|---|---|---|---|---|---|
| Day-Time | A | LV1:006 | PN1:069 | B1:30 | 30% (Bellsprout) |
| | | LV2:004 | PN2:023 | B2:60 | 30% (Ekans) |
| | | LV3:006 | PN3:179 | B3:80 | 20% (Merriep) |
| | | LV4:006 | PN4:187 | B4:90 | 10% (Hanecco) |
| | | LV5:006 | PN5:019 | B5:95 | 5% (Rattata) |
| | | LV6:008 | PN6:041 | B6:99 | 4% (Zubat) |
| | | LV7:008 | PN7:041 | B7:100 | 1% (Zubat) |

| Time Zone | Appearance Probability | Level | Pokemon Number | Pokemon Pointer | Individual Appearance Probability |
|---|---|---|---|---|---|
| Night | A | LV1:006 | PN1:194 | B1:30 | 30% (Upah) |
| | | LV2:004 | PN2:023 | B2:60 | 30% (Ekans) |
| | | LV3:006 | PN3:069 | B3:80 | 20% (Bellsprout) |
| | | LV4:006 | PN4:179 | B4:90 | 10% (Merriep) |
| | | LV5:008 | PN5:194 | B5:95 | 5% (Upah) |
| | | LV6:008 | PN6:041 | B6:99 | 4% (Zubat) |
| | | LV7:008 | PN7:041 | B7:100 | 1% (Zubat) |

Fig. 4

| | | | | | | | | | | | | | |
|---|---|---|---|---|---|---|---|---|---|---|---|---|---|
| | | I1 | I2 | I3 | I4 | I5 | I6 | I7 | I8 | I9 | J1 | J2 | J3 | J4 |

<br>

Obtained Pokemon Data Region DAamP

| | I1 | I2 | I3 | I4 | I5 | I6 | I7 | I8 | I9 | J1 | J2 | J3 | J4 |
|---|---|---|---|---|---|---|---|---|---|---|---|---|---|
| R1 | PM No. | HP | Exper. | Level | Status | Attack | Player | AB.P. | Spare | Sex | Item | Virus | Spare |
| R2 | | | | P(R2, I1) ~ P(R2, I9) | | | | | | P(R2, J1) ~ P(R2, J4) | | | |
| RN | | | | P(RN, I1) ~ P(RN, I9) | | | | | | P(R2, J1) ~ P(RN, J4) | | | |

Environmental Data Region DoP

| Location Playing Time Name, or the like | DoN |
|---|---|

Fig. 6
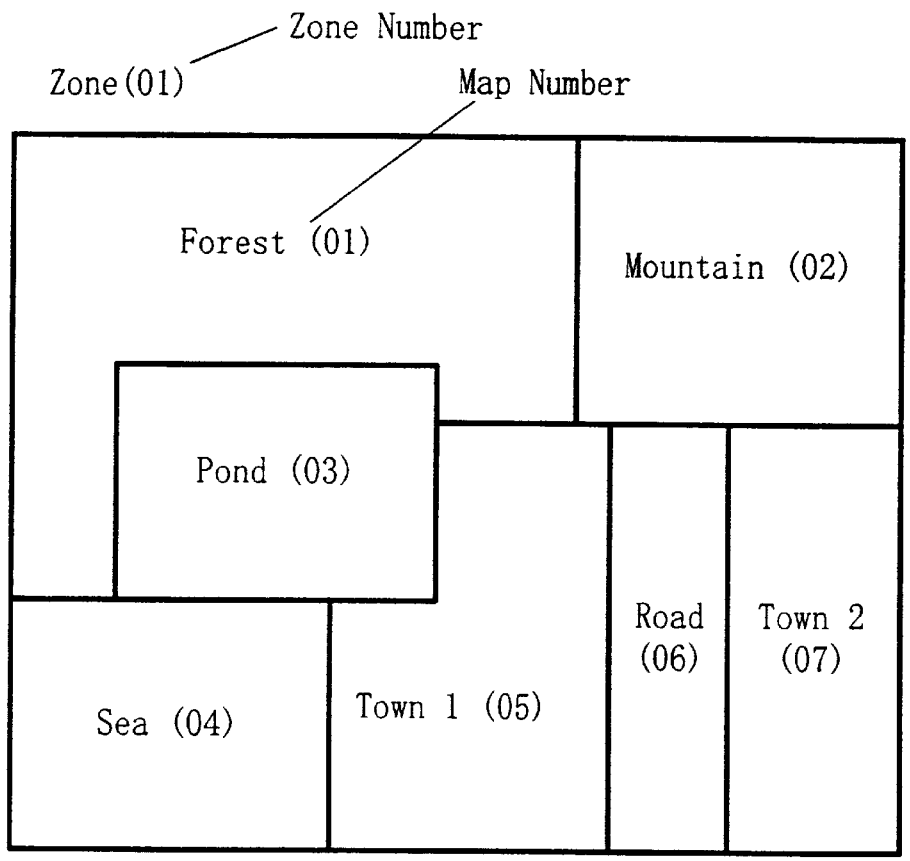
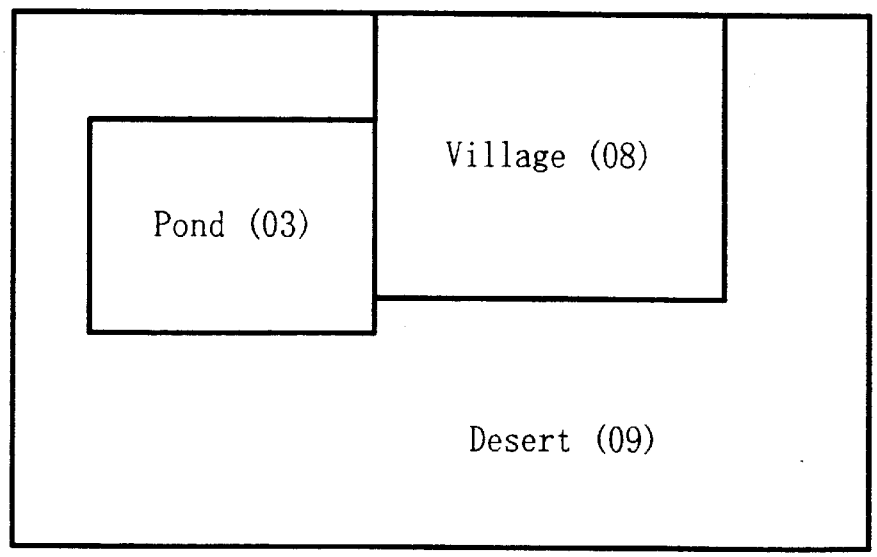

Fig. 13  Prior Art

| | I1 | I2 | I3 | I4 | I5 | I6 | I7 | I8 | I9 |
|---|---|---|---|---|---|---|---|---|---|
| | \multicolumn{9}{c}{Obtained Pokemon Data Region DAamC} | | | | | | | | |

| | I1 | I2 | I3 | I4 | I5 | I6 | I7 | I8 | I9 |
|---|---|---|---|---|---|---|---|---|---|
| R1 | PM No. | HP | Exper. | Level | Status | Attack | Player | A.B.P. | Spare |
| R2 | | | P(2,I1) ~ P(2,I9) | | | | | | |
| ⋮ | | | | | | | | | |
| RN | | | P(N,I1) ~ P(N,I9) | | | | | | |

Environmental Data Region DoC

Location
Playing Time
Name, or the like

GAME MACHINE APPARATUS AND METHOD WITH ENHANCED TIME-RELATED DISPLAY OF POKEMON-TYPE CHARACTERS

BACKGROUND OF THE INVENTION

1. Field of the Invention

The present invention relates to image-display game machines, image-display game systems, and information storage media storing game programs therefor. More specifically, the present invention relates to video game machines and portable game machines capable of simulating the capturing, training, and exchanging characters including those which appear to be monsters, and an information storage medium storing a game program therefor. Those characters are additionally provided with property data depending on time or time zone.

2. Description of the Background Art

Conventionally, video game machines adopting time-varying factors are disclosed in Japanese Laying-Open Publications (examined Patent Publications) No. 7-98104 (hereinafter referred to as "prior art 1"), No. 7-98105 (hereinafter referred to as "prior art 2"), and No. 7-98106 (hereinafter referred to as "prior art 3"). According to each of these prior arts 1, 2, and 3, a calendar timer is provided in a game machine cartridge for carrying out a predetermined event on a predetermined date or day of the week.

In addition to the above prior art, a game referred to as "Pocket Monster (four versions of red, green, blue, and yellow)" (trade name; hereinafter referred to as "prior art 4") which is designed and marketed by the assignee of applicants is available. The prior art 4 is a type of game capturing, training, and exchanging characters (hereinafter referred to as either pocket monsters or characters). For each version of the game, the appearance probability of a pocket monster (hereinafter shortened as "Pokemon", as required) is set differently. A player can capture or collect the maximum number of monsters by exchanging their monsters therebetween after playing each version of the game.

By referring to a block diagram shown in FIG. 12, the structure of the conventional image-display game machine according to the prior art 4 is described. A conventional image-display game machine GBC is roughly classified into a program source 100C and a game machine 200. The program source 100C stores information such as programs necessary for executing the image-display game on the game machine 200 and is detachably connected to the game machine 200.

The program source 100C is preferably structured in a form of cartridge including a ROM 11C, a RAM 12C, a memory bank controller 15, and a connector 13. The ROM 11C is implemented by non-volatile memory such as ROM, flash memory, and EEPROM to fixedly store the game program. The ROM 11C stores programs required by the contents of the game. If the game is a type of capturing and training characters such as monsters, for example, the stored programs are a capturing program and a training program. The ROM 11C also stores dot data for displaying each monster as an image and further stores a program for exchanging data, as required, among other game machines 200.

The RAM 12C is implemented by readable/writable memory, typified by RAM, and includes a memory region for storing a plurality of property data items for each type of character obtained in the course of playing the game.

The memory bank controller 15 divides a memory chunk of the ROM 11C into a plurality of banks when the memory chunk is too large for an address bus to address, and generates bank data for the higher address in the ROM 11C and for addressing a memory chunk in the RAM 12C. The ROM 11C, RAM 12C, and memory bank controller 15 are connected to the game machine 200 via the connector 13 in a detachable manner.

The game machine 200 is mainly structured by an operation switch portion 22, a central processing unit (CPU) 23, a connector 24, a RAM 25, a display controller 26, a liquid crystal display (LCD) 27, an interface 28, and a connector 29. The RAM 25 and the display controller 26 are connected to the CPU 23. The RAM 25 is working memory that temporarily stores data necessary for processing during the game. The LCD 27 is connected to the display controller 26.

Further, the CPU 23 is connected to the connector 29 through the interface circuit 28. The connector 29 is connected to another connector 29 of a separate game machine 200 via a cable when the player exchanges the obtained characters such as monsters with another player who is an owner of another game machine 200. Note that the CPU 23 is connected with the program source 100C through the connector 24.

Next, by referring to FIG. 13, the structure of a memory region of the RAM 12C is described in detail. The memory region of the RAM 12C includes an obtained Pokemon data region DAamC and an environmental data region DoC. The obtained Pokemon data region DaamC stores data that defines each of the obtained game characters, or Pokemons, and properties thereof. Each of the obtained Pokemons is recorded and identified as any of records R1 to RN (where N is a natural number). Each record R has fields I1 to I9 for each storing item that defines the obtained Pokemon.

In the field I1, a monster code (Pokemon number) assigned for each type of Pokemon is stored.

In the field I2, hit points (HP) possessed by the Pokemon are stored.

In the field I3, experience points possessed by the Pokemon are stored.

In the field I4, a level of the Pokemon is stored.

In the field I5, a status of the Pokemon is stored.

In the field I6, technique (possible attack) data of the Pokemon is stored.

In the field I7, an ID showing a player is stored.

In the field I8, values indicating Pokemon's ability such as an attack power, a defense power, a special attack power, a special defense power, and quickness are stored.

The field I9 is a spare field for storing data other than the above items stored in the fields I1 to I8.

Note that the data stored in the above fields I2, I3, I4, I5, I6, I8 and I9 are updated with the progress of the game.

As described above, each obtained Pokemon is defined by any of the records R1 to RN, and the properties thereof are defined by the fields I1 to I9. That is to say, a property of an arbitrary obtained Pokemon is represented by P (Rn, Im), where n is a natural number equal to or smaller than N, and m is a natural number equal to or smaller than 9. The property data stored in the fields I1 to I9, however, does not have a time-varying factor such as time or time zone giving an unexpectance to the game.

In the environmental data region DoC, environmental data required for the progress of the game are stored. Such data includes a location, a time when the game is played, a name of a player, and the like. The data stored in the environmental data region Doc does not have a time-varying factor such as time or time zone giving an unexpectance to the game.

As described in the foregoing, according to the prior art 1, 2, and 3, a player just enjoys a predetermined event carried out by a program on a predetermined date or day of the week but can not enjoy capturing or exchanging the characters. Accordingly, once the player learned what event is carried out on what time, the unexpectancy of the event is dismissed. Thus, the player soon becomes not interested in the game.

On the other hand, compared with the prior art 1, 2, and 3, the player can enjoy the game in the prior art 4 relatively longer without losing his/her interest. Further, it is helpful to deepen communications and cultivate friendships through exchanging the monsters with friends. However, also in the prior art 4, the player will get tired of the game as time passes.

A main object of the present invention is to provide an image-display game machine and an information storage medium storing a game program therefor that diversifies contents of the game and increases amusement so as to stir up aspirations of the player to challenge the game many times by introducing the time-varying factor. Another object is to provide an image-display game machine and an information storage medium storing a game program therefor that provides more fun by changing property data of characters such as monsters based on the thus introduced time-varying factor to further diversify the developments in the game depending on a player's knowledge and thinking.

SUMMARY OF THE INVENTION

A first aspect of the present invention is directed to a game machine of a type that a player object is moved on a map to encounter with a character, comprising:

a program storage for storing a game program;

a clock for clocking at least a time;

an operation device actuated by the player for operating the player object; and a processor for executing the program and processing image to vary a display image based on the operation of the operation device, wherein the game program storage stores a program for varying an appearance condition of the character appearing on the game map based on time information of the clock.

As described above, in the first aspect, the appearance condition of the character appearing on the game map varies depending on the time. As a result, the game becomes more fun with an unexpected factor.

According to a second aspect, in addition to the first aspect, the game program storage stores the program in which the appearance condition of the character appearing on the game map is set at a predetermined probability distribution in a time zone based on the time information of the clock.

According to a third aspect, in addition to the first aspect, the game program storage stores the program in which a type of the character appearing at a location on the game map is set to vary depending on the time zone based on the time information of the clock.

According to a fourth aspect, in addition to the second aspect, the game machine further comprising:

a first random number generator for generating a first random number;

a first comparator for comparing the appearance condition with the first random number; and an appearance device for performing appearance processing for making the character appeared on the map when the appearance condition has a predetermined relation with the first random number.

According to a fifth aspect, in addition to the fourth aspect, the game machine further comprising:

a second random number generator for generating a second random number;

a second comparator for comparing a plurality of character pointers each indicating a different value depending on a character appearing on the game map with the second random number; and a character appearance device for making a character indicated by any of the character pointers having a predetermined relation with the second random number appeared on the game map.

According to a sixth aspect, in addition to the first aspect, the character is an imaginary creature distinguishable by sex, and the game program storage stores a program in which, when the same type creatures having different sex are coupled and kept in a same region, a child inheriting properties of the both sexes of the creature type is set to be born based on an elapse of a predetermined time.

A seventh aspect of the present invention is directed to a medium on which a game program for controlling a game machine of a type that a player object is moved on a map to encounter with a character is stored, the game program for making said game machine to execute the operation comprising the steps of:

clocking a time;

detecting an operation of the player object by a player;

varying a display image based on the detected operation of the player object; and varying an appearance condition of the character appearing on the game map based on the clocked time.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram schematically showing the structure of a Pokemon appearance probability table storage region shown in FIG. 2;

FIG. 4 is a diagram schematically showing the structure of a memory region in RAM shown in FIG. 1;

FIG. 6 is a diagram exemplarily illustrating zone maps of the game executed in the image-display game machine according to the present invention;

FIG. 13 is a diagram schematically showing the structure of a memory region in RAM shown in FIG. 12.

DESCRIPTION OF THE PREFERRED EMBODIMENT

Figure 1:
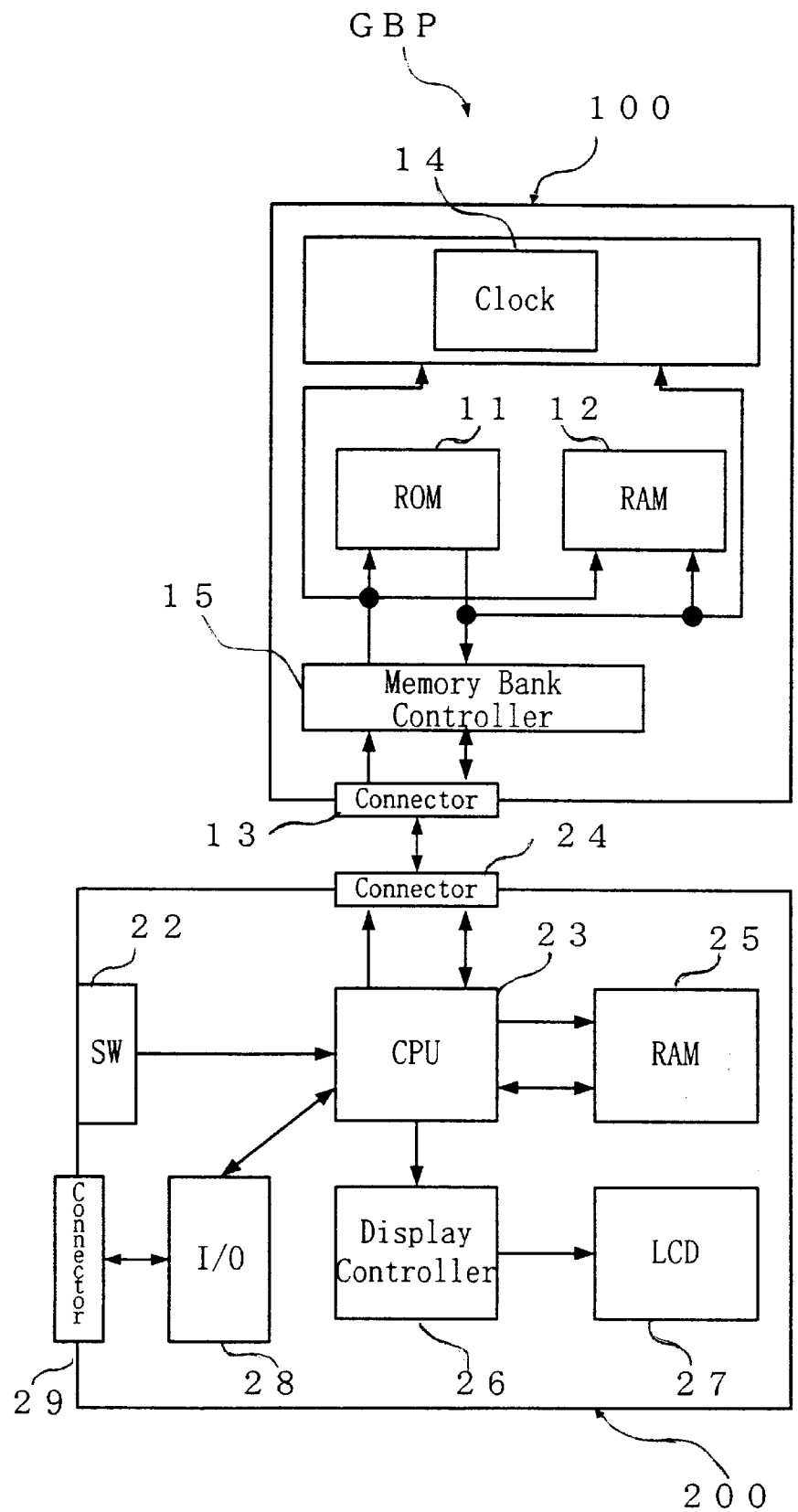
FIG. 1 is a block diagram showing the structure of an image-display game machine according to the present invention.

As shown in FIG. 1, an image-display game machine GBP of a present embodiment is roughly classified into a program source 100 and a game machine 200. The program source 100 stores information such as programs necessary for executing an image-display game on the game machine 200 and is detachably connected to the game machine 200.

The program source 100 is preferably structured in a form of cartridge including a ROM 11, a RAM 12, a clock 14, and a memory bank controller 15. The ROM 11 is implemented by non-volatile memory such as ROM, flash memory, and EEPROM to fixedly store the game program. The ROM 11 stores programs required depending on the contents of the game. If the game is a type of capturing and training monsters, for example, stored programs are a capturing program and a training program.

Figure 12:
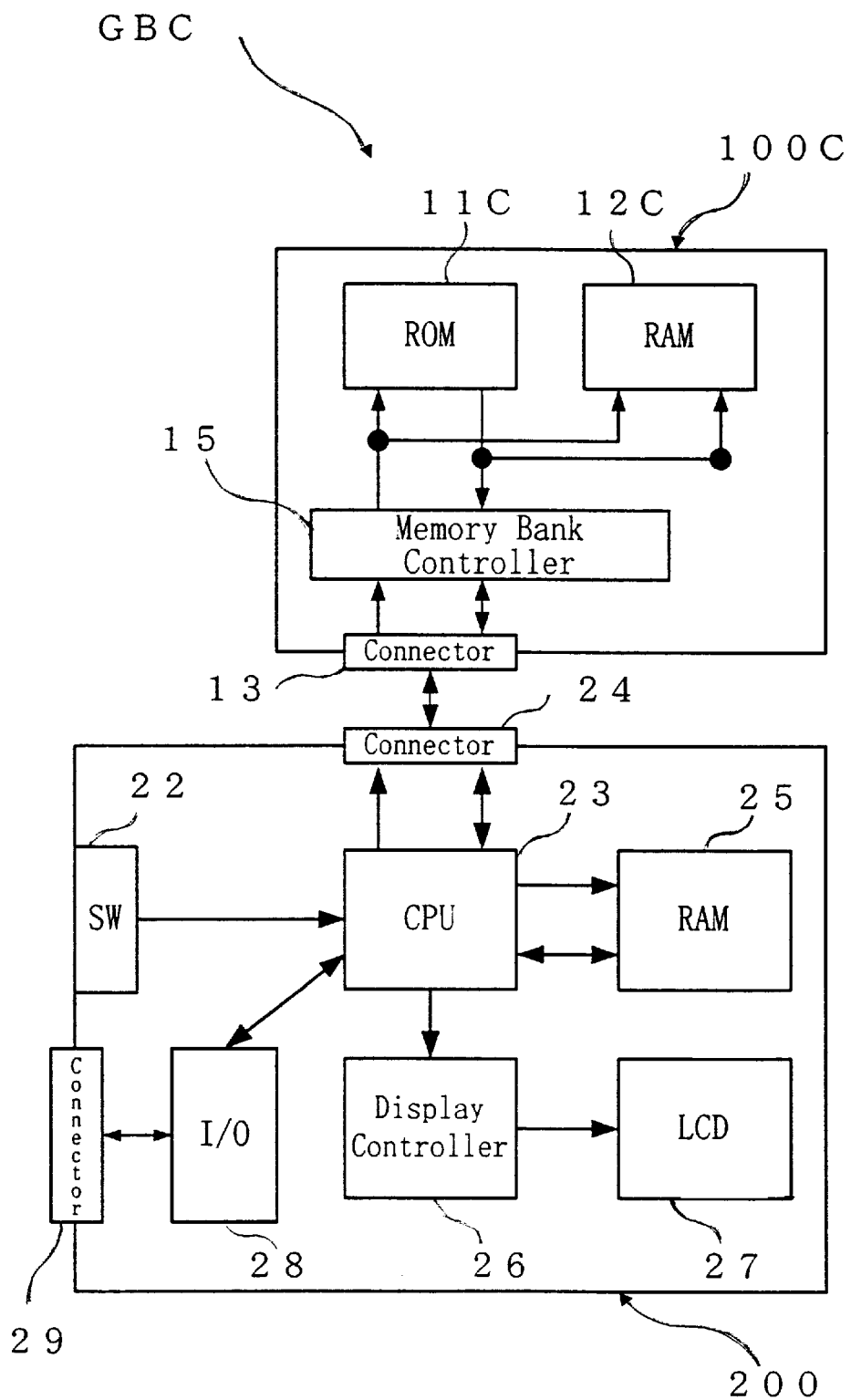
FIG. 12 is a block diagram showing the structure of a conventional image-display game machine.

Further, the ROM 11 stores dot data for displaying each monster as an image, and at the same time, stores a program for exchanging data, as required, among other portable game machines 200 (not shown) and a program for achieving compatibility with the program stored in the program source 100C of the conventional image-display game machine GBC shown in FIG. 12.

Note that, hereinafter, the program source 100 (new cartridge) and the conventional program source 100C (cartridge already in the market) are collectively referred to as a cartridge 100 except for the case where the distinction is required therebetween.

The RAM 12 is implemented by readable/writable memory, typified by RAM, and includes a memory region for storing a plurality of property data items for each of characters obtained in the course of playing the game.

Figure 2:
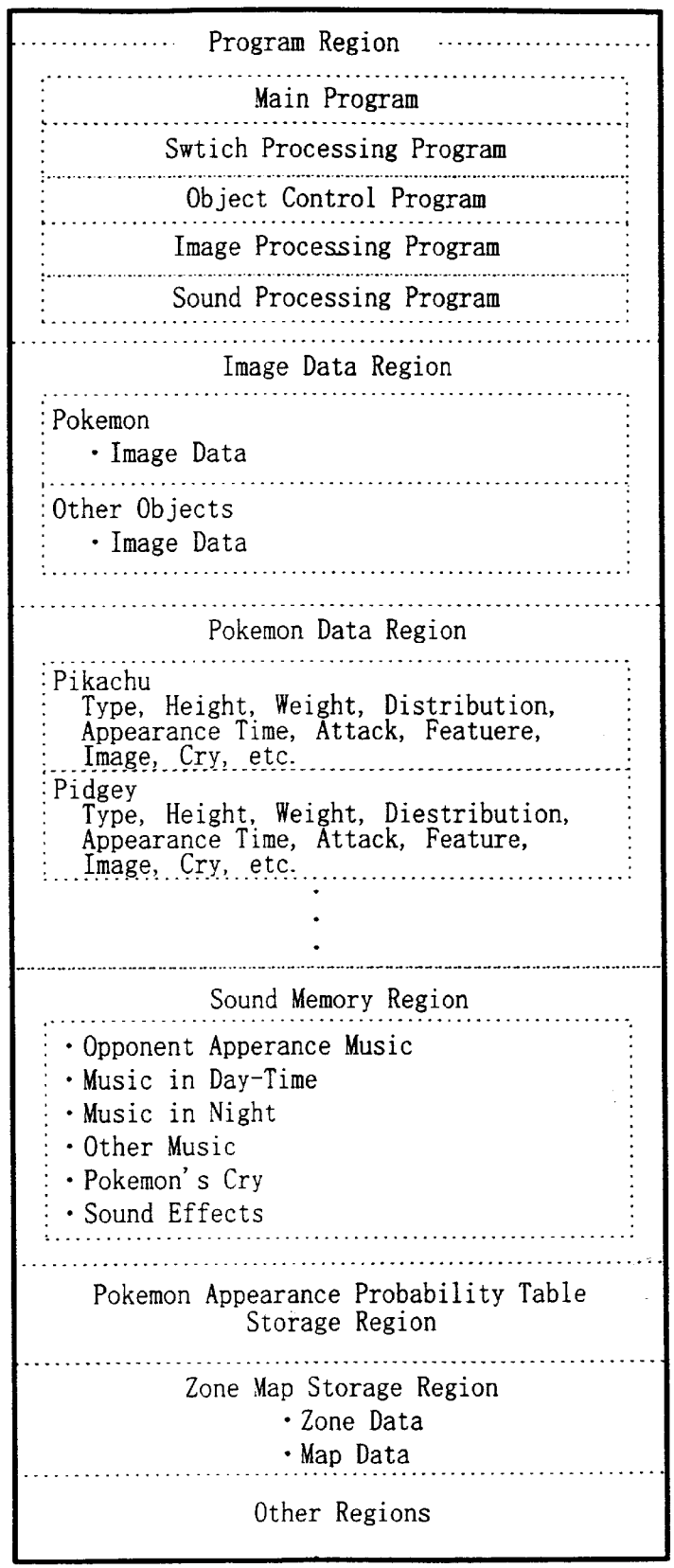
FIG. 2 is a diagram schematically showing the structure of a memory region in ROM shown in FIG. 1.

Next, by referring to FIG. 2, the structure of the memory region of the ROM 11 is described in detail. The memory region of the ROM 11 in the present embodiment broadly includes a program region, an image data region, a Pokemon data region, a sound memory region, a Pokemon appearance probability table storage region, a zone map storage region, and other regions.

Among these regions, a time-varying factor such as time and time zone, which is a feature of the present invention, is introduced in the Pokemon data region, the sound memory region, and the Pokemon appearance probability table storage region.

First, by referring to FIG. 3, a Pokemon appearance probability table stored in the Pokemon appearance probability table storage region is described. The Pokemon appearance probability table is provided for varying the appearance probability of the Pokemon depending on a location on the game map and on a time zone. Although not clearly indicated in FIG. 3, the Pokemon appearance probability table defines the appearance probabilities for every Pokemons that appear at the same location during the same time zone.

More specifically, in the Pokemon appearance probability table, three time zones, morning, daytime, and night, are set for each location. Further, for each time zone, a total appearance probability A, which is the probability that all Pokemon may appear at the location is defined. In the present embodiment, the seven units of Pokemons are assumed to appear at the same location for each time zone of morning, daytime, and night. The seven units of Pokemons may be selected from all Pokemons, allowing that the same type of Pokemon is repeatedly selected.

For convenience of description, the morning time zone is taken as an example, and the structure of the Pokemon appearance probability table is specifically described. Pokemon numbers (monster codes) of the seven Pokemon units that can appear during one time zone (morning) are registered in appearing Pokemon numbers of PN1 to PN7, respectively. That is, in the appearing Pokemon number PN1, the BELLSPROUT is registered. Similarly, in the appearing Pokemon numbers of PN2, PN3, PN4, PN5, PN6, and PN7, the EKANS, MERRIEP, HANECCO, RATTATA, ZUBAT, and ZUBAT are registered, respectively. Note that the ZUBAT is registered twice.

The Pokemons registered in the appearing Pokemon numbers PN1 to PN7 are set with respective levels of LV1 to LV7, Pokemon pointers of B1 to B7 as being thresholds to permit the appearance of respective Pokemons, and individual appearance probabilities. To be specific, the individual appearance probability of the BELLSPROUT, which is registered in the appearing Pokemon number PN1 as the Pokemon number 069, is 30 percent, and the Pokemon pointer B1 and the level LV1 thereof are 30 and 006, respectively.

In the same manner, the individual appearance probability of the EKANS, which is registered in the appearing Pokemon number PN2 as the Pokemon number 023, is 30 percent, and the Pokemon pointer B2 and the level LV2 thereof are 60 and 004, respectively. The appearing Pokemon numbers PN3 to PN7 are defined as well, as shown in FIG. 3.

Note that, in the similar way to the morning time zone, the Pokemons are individually registered in the appearing Pokemon numbers PN1 to PN7 respectively provided for the time zones of daytime and night.

Next, by referring to FIG. 4, a memory region of the RAM 12 is structurally described in detail. In the embodiment, the memory region of the RAM 12 includes an obtained Pokemon data region DAamP and an environmental data region DoP. The obtained Pokemon data region DAamP is similar to the obtained Pokemon data region DAamC of the conventional RAM 12C in that the obtained game characters, or the Pokemons and the properties thereof are stored therein. Accordingly, the obtained Pokemon data region DAamP includes the records R1 to RN, each of which is structured by the fields I1 to I9 that are included in the obtained Pokemon data region DAamC.

In each record R included in the obtained Pokemon data region DAamP, however, at least four fields of J1, J2, J3, and J4 are newly provided in addition to the above fields I1 to I9.

In the field J1, the sex of the obtained Pokemon is stored.

In the field J2, the item(s) possessed by the obtained Pokemon is/are stored.

In the field J3, a state indicative of whether the obtained Pokemon is infected by a virus is stored. An infected monster is rarely found as a scarcity value, and is set to raises the HP, experience points, the level, the ability value, or the like by training at the faster rate compared with the uninfected monsters.

The field J4 is the spare field for storing data other than the above items stored in the fields J1 to J3.

Note that an arbitrary number of O fields J1 to JO can be provided instead of four fields of J1 to J4, where O is a natural number.

Also note that the above described fields I1 to I9 are the storage regions commonly allocated for the conventional program source 100C and the program source 100 of the present invention. Thereby, the program source 100C (RAM 12C) and the program source 100 (RAM 12) become compatible with each other. On the other hand, the fields J1 to J4 are regions uniquely allocated for the program source 100 (RAM 12) of the present invention.

In the present invention, the obtained Pokemons are defined by the records R1 to RN, respectively, and the properties of the each obtained Pokemon are defined by the fields I1 to I9 and J1 to J4. That is, a property of an obtained Pokemon is represented by P (Rn, Im) or P (Rn, Jo), where o is a natural number equal to or smaller than 4.

The environmental data region DoP includes, the environmental data region DoC shown in FIG. 13, and a region DoN newly provided for storing environmental data relating to the data newly set for the ROM 11 in the present invention.

Referring back to FIG. 1, the clock 14 includes at least a timer for clocking, and also includes a calendar function of indicating a date (month/day) and a day of the week, as required.

The memory bank controller 15 divides a memory chunk of the ROM 11 into a plurality of banks when the memory chunk is too large for an address bus to address, and generates bank data for the higher address in the ROM 11 and for addressing a memory chunk in the RAM 12.

The clock 14 and the memory bank controller 15 are preferably implemented in a single chip of integrated circuit (IC) to reduce the number of chips, reducing costs. A substrate on which the single chip IC including the ROM 11 and RAM 12 is accommodated in a case or housing.

The game machine 200 is identical to that described by referring to FIG. 12.

Figure 5:
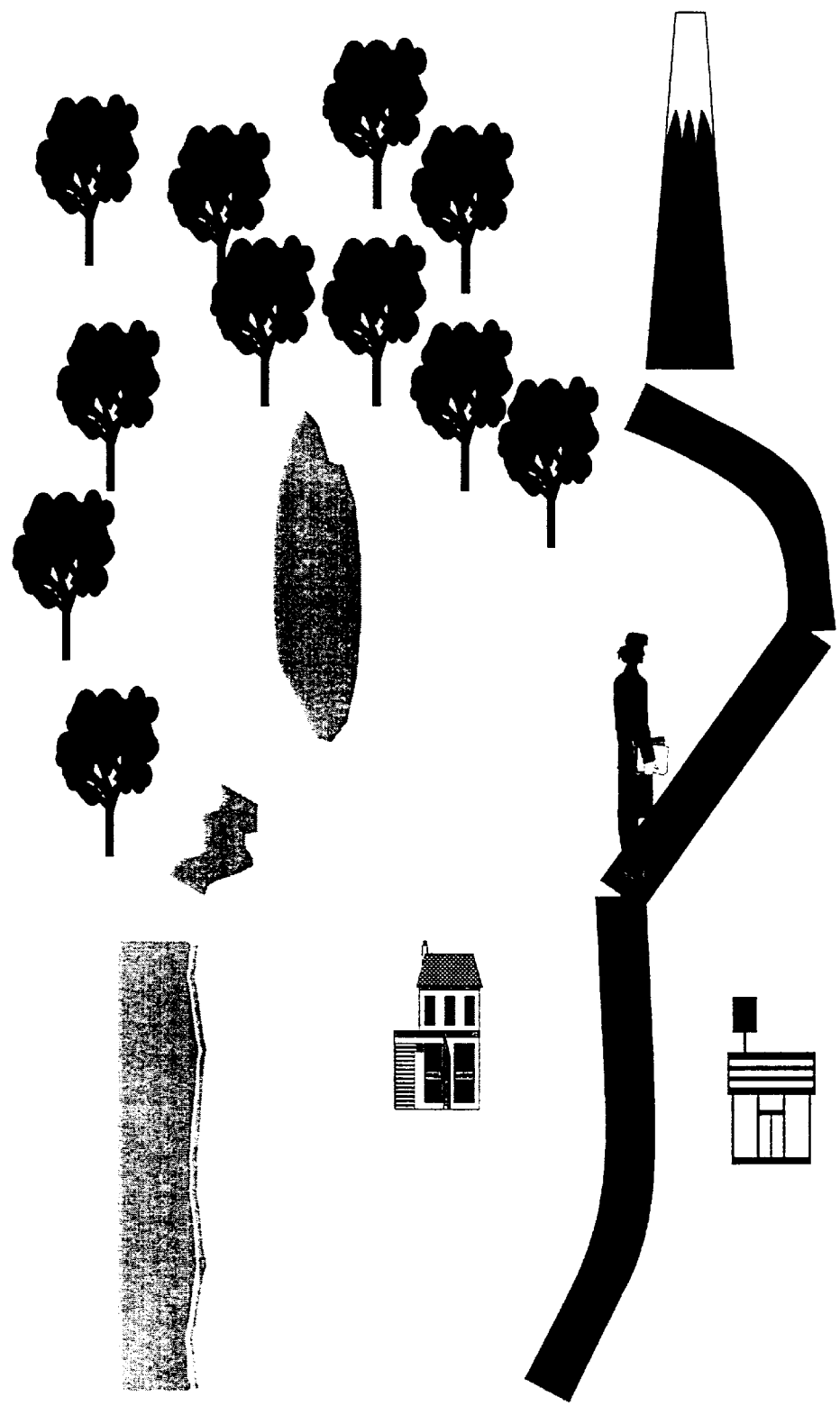
FIG. 5 is a diagram exemplarily illustrating a zone map of a game executed in the image-display game machine according to the present invention.

In FIG. 5, an example of a game map displayed on the game machine 200 based on image data stored in the image data region is shown.

In FIG. 6, zone data and map data stored in the zone map storage region is schematically shown.

Figure 7:
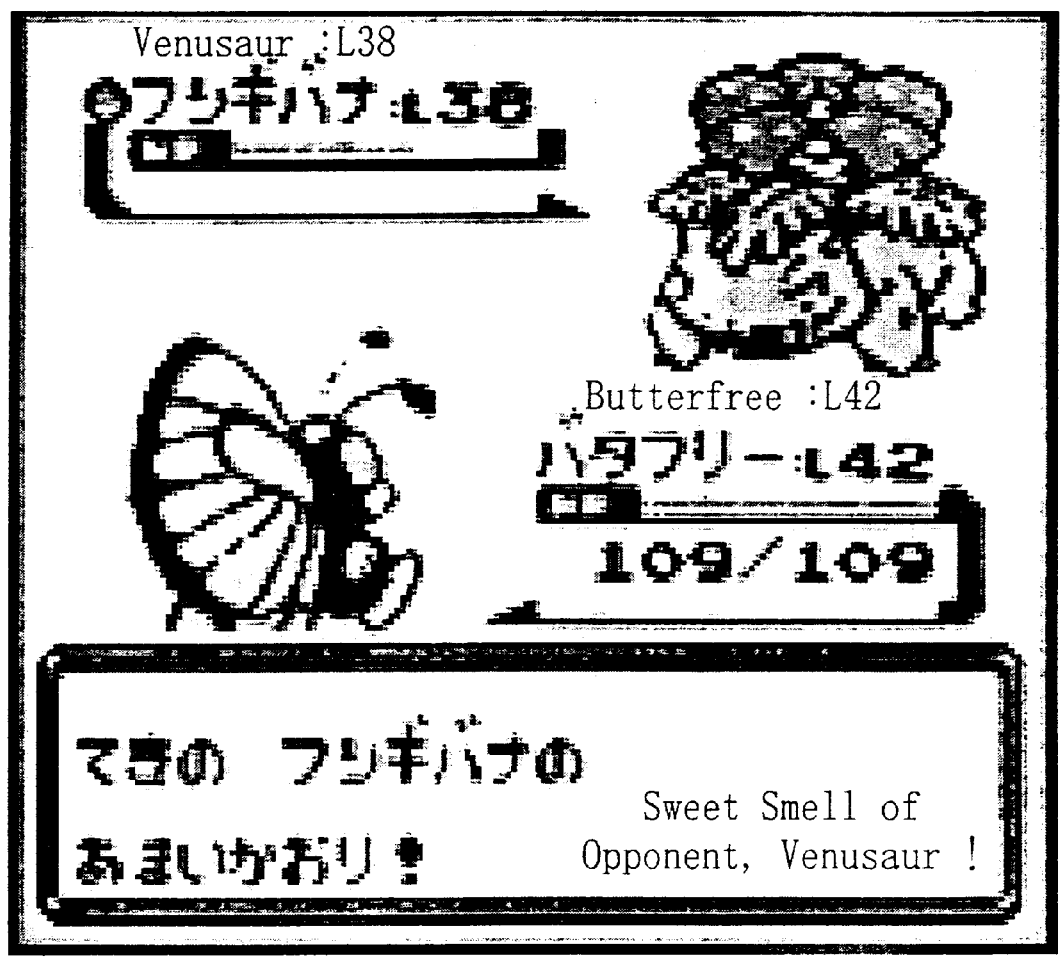
FIG. 7 is a diagram showing a battle state in the game executed in the image-display game machine according to the present invention.

In FIG. 7 an example of a battle state in the game performed in the image-display game machine according to the present invention is shown.

Figure 8:
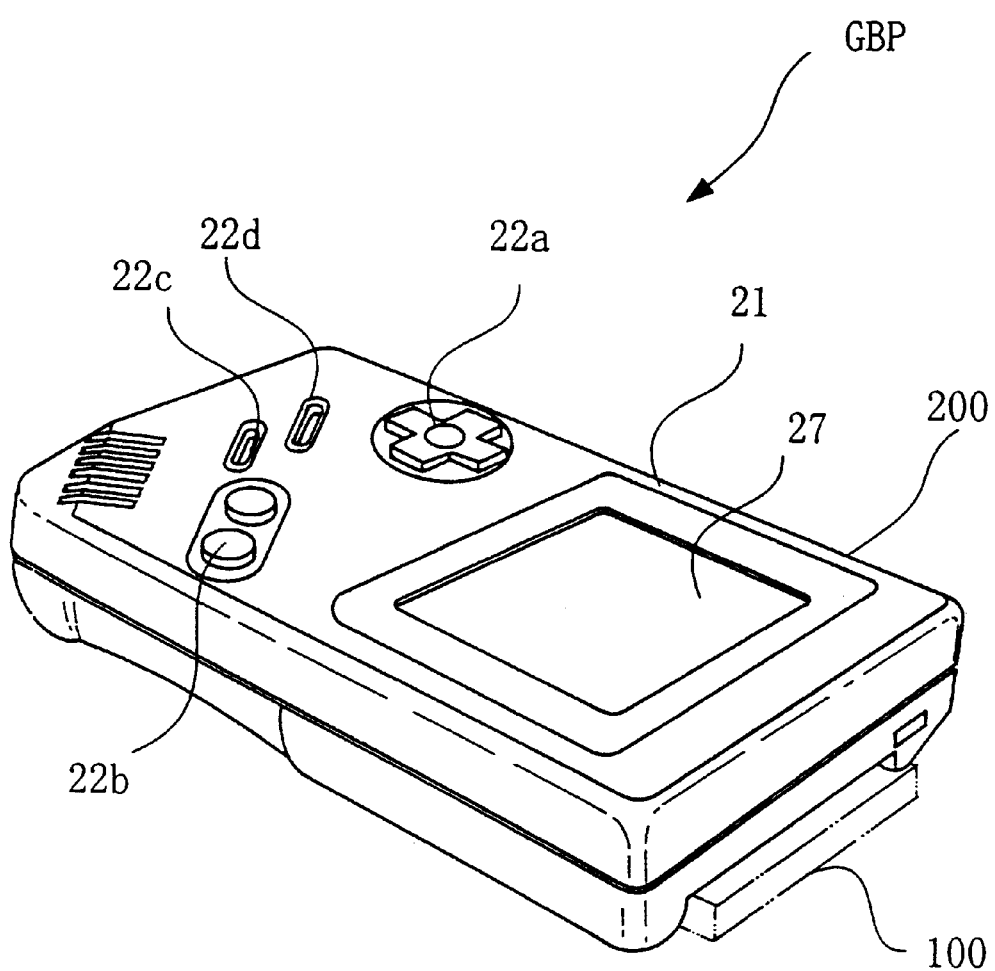
FIG. 8 is a diagram showing an appearance of a portable game machine as an example of the image-display game machine according to the present invention.

In FIG. 8, an exemplary implementation of the image-display game machine GBP of the present invention as a portable game machine is shown. In the image-display game machine GBP, a connector 13 of the cartridge 100 (FIG. 1) is engaged into a connector 24 (FIG. 1) provided on the rear surface of the game machine 200. On the lower-end side of front surface (plane) of a housing 21 of the game machine 200, the operation switch portion 22 is provided, and on the upper part thereof, the LCD 27 is provided. In the housing 21, a circuit board composed of the circuitry components shown in FIG. 1 is provided.

The operation switch 22 includes a direction switch 22a for instructing cursor movement or moving directions of the character operable by the player, an action switch 22b for instructing character's action including movement, a start switch 22c, and a select switch 22d.

Described next is the operation of the image-display game machine according to the embodiment of the present invention. First, the player presses the start switch 22c and then the game starts. After a title screen is displayed, some area of the game map shown in FIG. 5 is displayed as an initial screen.

To capture the monster, the player operates the direction switch 22a to move a player character (player object) to a probable location on the game map where the monster is hiding. A water-type monster hides in a pond or sea, and a herbivorous-type monster hides in a grassy area, farm field, or woods.

As described by referring to the Pokemon appearance probability table shown in FIG. 3, the monsters each have the characters unique thereto, and some of them appear only at a specified location and time. The appearance or disappearance of the monster is changed conditionally on whether the time measured by the clock 14 is at the time or in the time zone determined by a program. The appearance condition set for a nocturnal monster such as an owl or bat, for example, is gradually increasing or holds a constant low value for the evening; high-probability for the midnight; and gradually decreasing towards the dawn. No nocturnal monster appears during the daytime (zero probability).

On the other hand, a diurnal monster is set with the chronologically reverse appearing condition. Further, for a monster that changes a hiding place depending on a time zone or time, the program is so set that the location of the appearance is changed depending on time. For a monster living in water during the daytime but on land during the night, the program is set to change the habitat or move the monster depending on the time zone. Thus, the appearance probabilities in the Pokemon appearance table are properly set for each time zone and each type of Pokemon.

When the player captures a monster, the data items thereof are written in the corresponding fields of I1 to I9 and J1 to J4 in a vacant record Rn of the obtained Pokemon data region DAamp. As described by referring to FIG. 4 (and as shown in FIG. 13), the hit points (HP), the experience points, the level, the status, the possible attack, the ability, and the like possessed by the monster when it is captured are written in the respective fields of I2, I3, I4, I5, I6, I7, and I8 at the same time of a monster code of the captured monster is written in the field I1, Further, if the cartridge used by the player is the program source 100 according to the present invention defining the monster's properties of the sex, item, virus, or the like, such data items are stored in the respective fields of J1 to J3. A virus-infected monster is very rare as a scarcity value, and is set to raise the HP, the experience points, the level, the ability value, or the like by the training at the faster rate compared with the uninfected monster.

Accordingly, the player is willing to infect the captured monster with the virus for accelerating the growth or training thereof. The player, therefore, searches for the virus-infected monster to capture it. The player then puts the captured infected monster in a incubation box (incubation room) together with the uninfected monster so that the uninfected monster is infected with the virus to grow faster.

As described, the monster can be grown faster by being infected with the virus which helps the monster grow or raise the level, thereby advantageously shortening the training period required to raise the monster to a certain level.

Furthermore, when playing with the cartridge provided with the program source 100, the monster is provided with sex data. The time or the date when male and female monsters of the same type (same monster code) among the captured monsters are coupled and put in the same incubation box (incubation room) is temporarily recorded in a register. After predetermined days determined by a program have been counted starting from the registered time or date in the clock 14, a child inheriting the property data (ability, strength, etc.) from both of the male and the female monsters is born, increasing the types of collected monsters.

As such, various types of monsters become collectable with ease, the acceleration of the progress of the game become possible, and further, the player can enjoy training the child monster from the ground up. Note that if the player captures several of the same type monsters, it is also possible to exchange one of them with one of another type of monster that are captured by the friend and not owned by the player.

In a case where a player having the new version cartridge provided with the program source 100 and a player having the old version cartridge provided with the conventional program source 100C exchange the monsters, it is preferable to ensure compatibility therebetween as much as possible in handling of the data such as the sex data, item data and virus-infection data, or the like. For the sake of compatibility, one-bit data indicating the presence of data for fields J1 to J3 is stored in the field I9 at the time when the data is transferred from the new version cartridge to the old version cartridge.

When the game is played with the old version cartridge, additional data such as the sex data, item data, and virus-infection data is not used. In a case of transferring back the data from the old version cartridge to the new version cartridge, the one-bit data stored in the field I9 is also transferred, thereby enabling the utilization of the additional data by the player having the new version cartridge.

On the other hand, when the data is transferred from the old version to the new version, the sex data not stored in the old version cartridge, for example, is determined in a predetermined rule and written in the field J1 of the new version cartridge. As the exemplary rule, sex can be determined as male if the one place number of the "minutes" measured by the clock 14 is an odd number, and as female if an even number. Alternatively, the determination can be made based on random number data.

In such manner, compatibility is ensured as much as possible even if the monsters are exchanged between the old and the new version cartridges, thereby enabling data exchange among all players. Furthermore, when the player having the old version cartridge purchases the new version cartridge, the monsters trained with the old version cartridge can be transferred to the new version cartridge and can be effectively utilized.

The monsters newly captured by the player, the monsters newly born from the couple of the obtained monsters, and the monsters exchanged with the friends in the above described manner are used for the battles with the friends' monsters. The battle is performed by connecting the connectors 29 on the game machines 200 each other via the cable, and put each monster designated by each player on a battle field. In FIG. 7, the example of the battle state is shown.

Figure 9:
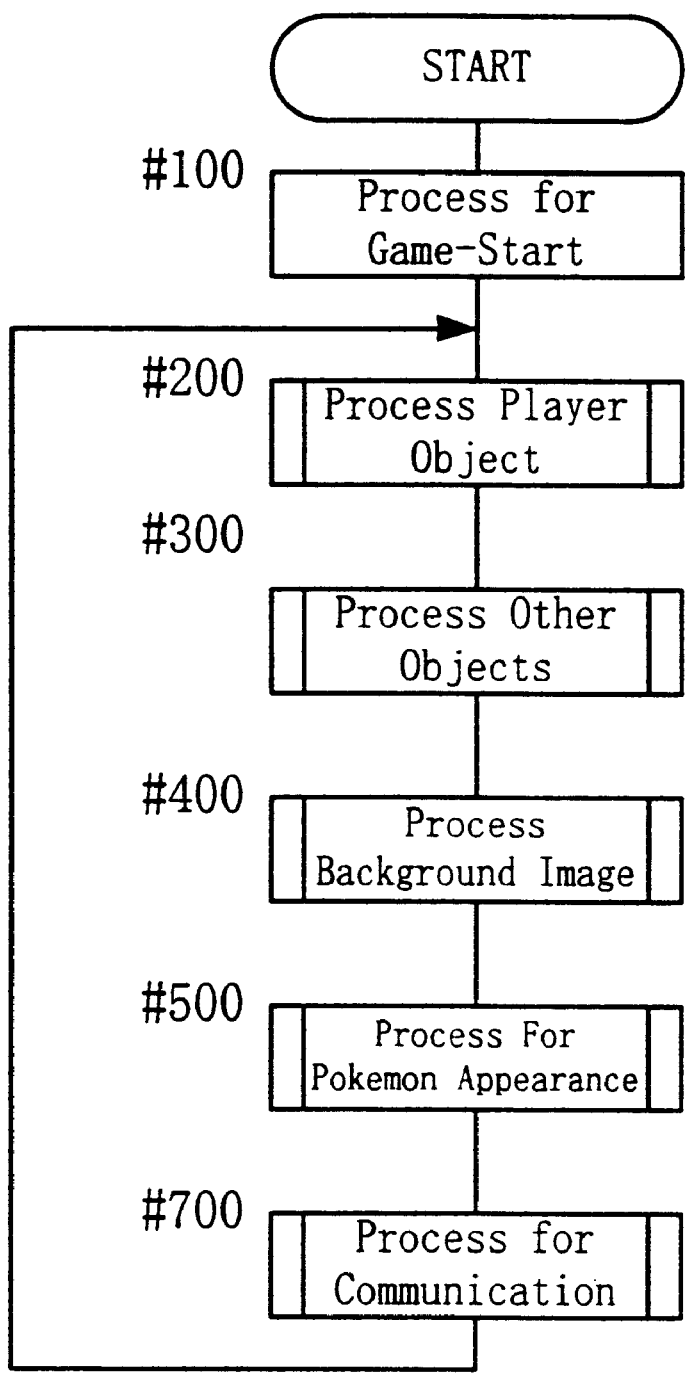
FIG. 9 is a flowchart showing the main operation of the image-display game machine shown in FIG. 1.

Next, by referring to a main flowchart shown in FIG. 9, the major operation of the image-display game machine GBP of the present invention is described. Thereafter, by referring to detailed flowcharts shown in FIGS. 10 and 11, a Pokemon appearance processing subroutine of step #500 in FIG. 9 is described in detail.

First, the player presses the start switch 22c, as shown in the main flowchart of FIG. 9.

In step #100, game-start processing is executed. Then the procedure advances to step #200.

In step #200, a player object processing subroutine is executed, and then the procedure advances to step #300.

In step #300, an object processing subroutine for the objects other than the player object is executed. Then the procedure advances to step #400.

In step #400, a background image processing subroutine is executed. Following the title screen displayed after going through the above steps #100, #200, #300, and #400, some area of the game map is displayed as the initial screen, and the player is ready for capturing the monsters. Then the procedure advances to step #500.

In step #500, the Pokemon appearance processing subroutine is executed. For capturing the monster, the player character (player object) is moved by operating the direction switch 22a to a probable location on the game map where the monster is hiding. Then the procedure advances to step #700.

In step #700, a communication processing subroutine is executed. In this step, for the purpose of exchanging the obtained monsters with a friend, or starting the battle with the monster obtained by the friend, the game machines 200 of the player and the friend are connected with each other for communication. Then, the procedure goes back to the above described step #200 and repeats steps #200 to #700 until the player turns off the switch of the image-display game machine GBP to end the game.

Figure 10:
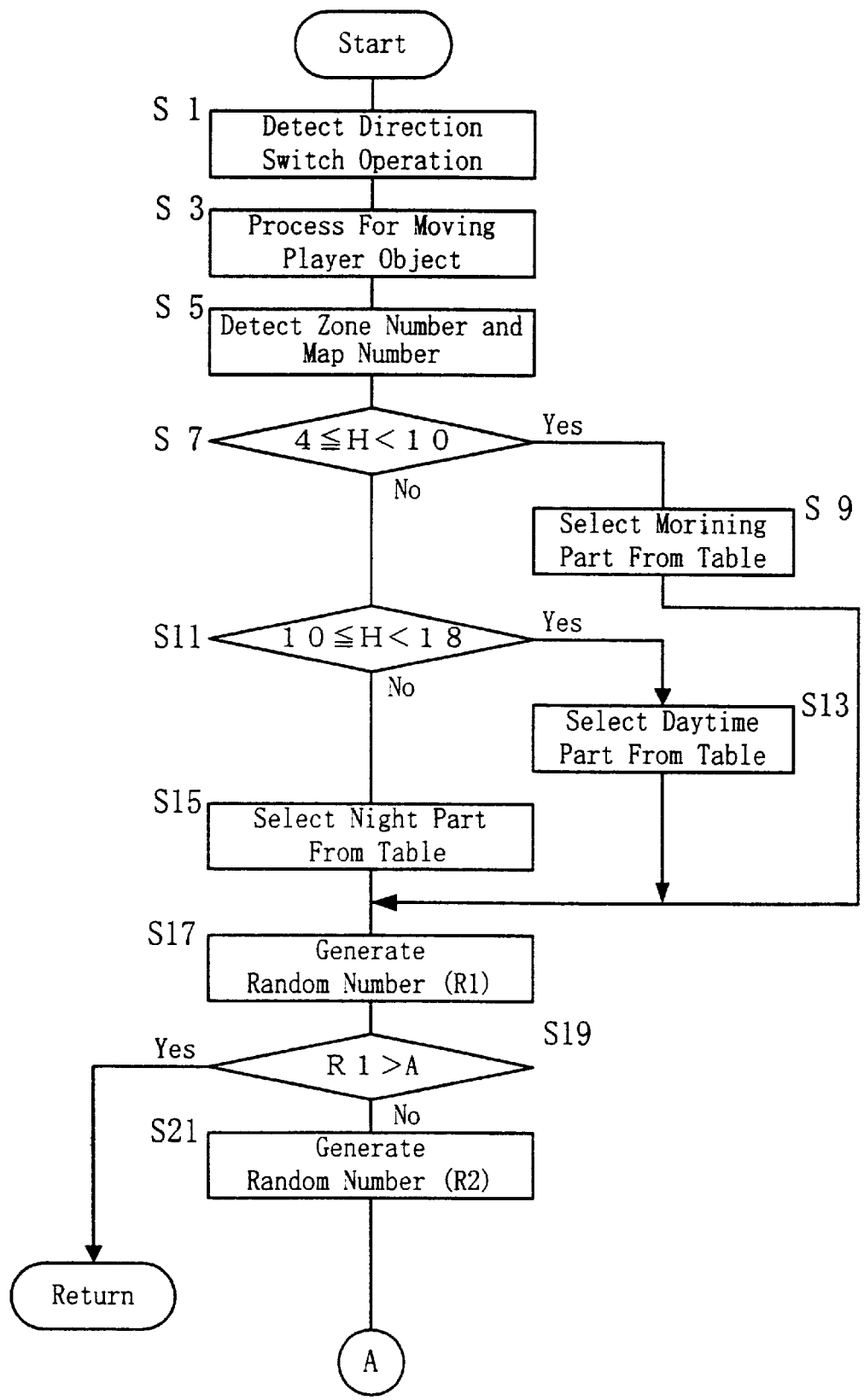
FIG. 10 is a flowchart showing a part of the operation in a Pokemon appearance processing subroutine shown in FIG. 9 in detail.

Next, by referring to FIG. 10, the detailed procedure in the above described Pokemon appearance subroutine of step #500 is described. After the processing in step #400, in this subroutine, when the player operates the direction switch 22a, in step S1, detection is made on a player-operation of the direction switch 22a and a direction thereof. Then, the procedure advances to step S3.

In step S3, processing to move the player object to the direction instructed by the direction switch 22a is performed. Then, the procedure advances to step S5.

In step S5, zone number and map number indicating the position on the game map exemplarily shown in FIG. 6 are detected. The player object stands on that position after moving in step S3. The procedure then advances to step S7.

In step S7, it is determined whether a time parameter H supplied from the clock 14 is equal to or larger than 4 and smaller than 10. That is to say, if the game is played between 4 a.m. and 10 a.m., "yes" is determined, and the procedure advances to step S9.

In step S9, a part indicating the morning time zone is selected from the Pokemon appearance probability table shown in FIG. 3. Then, the procedure advances to step S17.

On the other hand, if the time H is earlier than 4 a.m. or later than 10 a.m., "no" is determined in step S7, and the procedure advances to step S11.

In step S11, whether H is equal to or larger than 10 and smaller than 18 is determined. That is to say, if the time H is in the daytime between 10 a.m. and 6 p.m., "yes" is determined, and the procedure advances to step S13.

In step S13, a part indicating the daytime time zone is selected from the Pokemon appearance probability table. Then, the procedure advances to step S17.

On the other hand, if the time H is in the night hours of later than 6 p.m. and earlier than 4 a.m., "no" is determined in step S11, and the procedure advances to step S15.

In step S15, a part indicating the night time zone is selected from the Pokemon appearance probability table. Then the procedure advances to step S17.

In step S17, a random number R1 is generated in the range of 1 to 100. The procedure then advances to the next step S19.

In step S19, it is determined whether the random number R1 generated in step S17 is larger than the appearance probability A of total Pokemons provided for the time zone selected in step S9, S13, or S15. If determined to be "yes", the subroutine of step #500 ends and the procedure moves to step #700.

That is to say, in this step, the appearance or disappearance of the Pokemon at the place where the player object currently locates is randomly changed by comparing the random number R1 with the appearance probability A. In this manner, Pokemon appearance or disappearance is unexpected each time even at the same place. If "no" is determined, on the other hand, the procedure advances to the next step S21.

Figure 11:
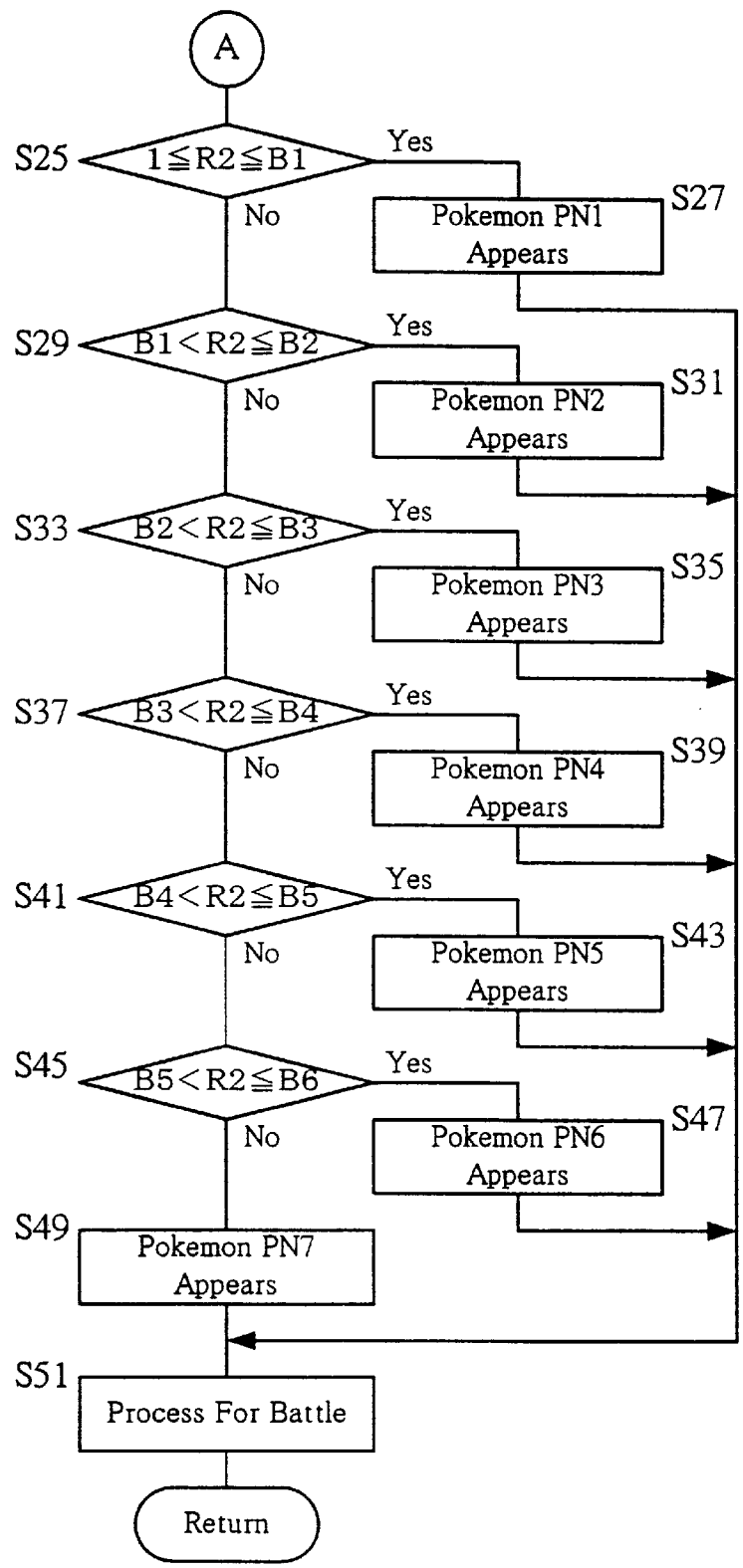
FIG. 11 is a flowchart showing the remaining part of the operation in a Pokemon appearance processing subroutine shown in FIG. 10 in detail.

In step S21, a random number R2 is generated in the range of 1 to 100. Then, the procedure advances to step S25 as shown by FIG. 11.

In step S25, it is determined whether the random number R2 generated in step S21 is equal to or larger than 1 and not larger than a value of the Pokemon pointer B1. If determined to be "yes", the procedure advances to step S27.

In step S27, the Pokemon of PN1 appears on the game map at the rate defined by its individual appearance probability. That is, if the random number R2 is equal to or larger than 1 and also not larger than or equal to the value of the Pokemon pointer B1, BELLSPROUT of the appearing Pokemon number PN1 defined by the Pokemon pointer B1 appears on the game map at 30 percent ratio with the image and sound. Then, the procedure advances to step S51.

On the other hand, if determined to be "no" in step S25, the procedure advances to step S29.

In step S29, it is determined whether the random number R2 is larger than B1 and not larger than or equal to B2. If determined to be "yes", the procedure advances to step S31.

In step S31, the Pokemon of PN2 appears on the game map. Then, the procedure advances to step S51. As such, one unit of Pokemon is selected from among seven units (Pokemons PN1 to PN7) by comparing the random number R2 with each of the Pokemon pointers B1 to B6. As a result, the selected Pokemon unit appears on the game in accordance with the individual appearance probability thereof.

On the other hand, if determined to be "no" in step S29, the procedure advances to step S33.

In step S33, whether the random number R2 is larger than B2 and not larger than or equal to B3 is determined. If "yes", the procedure advances to step S35.

In step S35, the Pokemon PN3 appears on the game map in accordance with the individual appearance probability thereof. The procedure then advances to step S51.

On the other hand, if determined to be "no" in step S33, the procedure advances to step S37.

In step S37 whether the random number R2 is larger than B3 and not larger than or equal to B4 is determined. If "yes", the procedure advances to step S39.

In step S39, the Pokemon PN4 appears on the game map in accordance with the individual appearance probability thereof. The procedure then advances to step S51.

On the other hand, if determined to be "no" in step S37, the procedure advances to step S41.

In step S41, whether the random number R2 is larger than B4 and not larger than or equal to B5 is determined. If "yes", the procedure advances to step S43.

In step S43, the Pokemon PN5 appears on the game map in accordance with the individual appearance probability thereof. The procedure then advances to step S51.

On the other hand, if determined to be "no" in step S41, the procedure advances to step S45.

In step S45, whether the random number R2 is larger than B5 and not larger than or equeal to B6 is determined. If "yes", the procedure advances to step S47.

In step S47, the Pokemon PN6 appears on the game map in accordance with the individual appearance probability thereof. The procedure then advances to step S51.

On the other hand, if determined to be "no" in step S45, that is, if it is determined that the random number R2 is larger than B6, the procedure goes to step S49.

In step S49, the Pokemon PN7 appears on the game map, and then the procedure advances to the next step S51.

In step S51, the battle is started with the Pokemon appeared in any of the steps S27, S31, S35, S39, S42, S47, or S49. Then the subroutine in step #500 ends and the procedure advances to step #700.

As described in the foregoing, in the present invention, the appearance probability of total Pokemons is defined for each location of the player object on the game map and each time zone (three types of morning, daytime, and night). Further, in each time zone, the appearance probabilities are respectively set for the seven units of Pokemons each having the individual level (LV1 to LV7).

When the player object is located on the game map, the Pokemons PN1 to PN7, in a part of the Pokemon appearance probability table indicating the corresponding time zone and the location, are initially selected as potential monsters for appearance.

Next, by using a first random number R1 as the threshold, in a case of the total appearance probability A of the selected Pokemons being smaller than the random number R1, all of the selected Pokemons are kept hiding at the location. The player's next operation of the direction switch 22a is awaited.

On the other hand, if the total appearance probability A of the selected Pokemons is larger than the first random number R1, it is decided to make one of the seven potential monsters PN1 to PN7 appeared at the location To select one out of seven, a second random number R2 is generated and compared, as the threshold, with each of the Pokemon pointers B1 to B7 specifying the selected Pokemons, respectively. As a result, only a Pokemon unit (PN) corresponding to a Pokemon pointer B that satisfies a predetermined relationship between the second random number R2 appears on the game.

As described, the first random number R1 and the total Pokemon appearance probability A are randomly determined in consideration of time and time zone factors for permitting the appearance of the Pokemon at a certain place on the game map. In this aspect, the first random number R1 and the total Pokemon appearance probability A serve as Pokemon appearance permitting means.

In addition, the second random number R2 and the Pokemon pointer B determine one of Pokemon units when the appearance is permitted. In this aspect, the second random number R2 and the Pokemon pointer B serve as individual Pokemon appearance permitting means.

Note, in the above described embodiment, although the portable game machine and the cartridge used therefor are described as the example of the image-display game machine, a video game machine connected to a television receiver may serve as an alternative. In such case, the information storage medium may be a game cartridge, an optical storage medium such as CD-ROM or DVD, a magnetic disk, or the like.

In the present invention, a game cartridge detachably connected to a portable game machine includes: program storage means (e.g., ROM) for storing a game program; readable/writable temporal storage means (e.g., RAM) for storing a plurality of property data items for each of the characters obtained in the course of playing the game; and clock means for clocking at least a time. The portable game machine (main body) includes: operation means (operation switch) operated by a player for performing operation for at least obtaining the character and training the character to increase its experience points; processing means (CPU); and display means (LCD) for displaying the result of processing performed by the processing means.

The processing means, by executing the program and based on the operation of the operation means, performs image processing as to vary the image on the display. The processing means also varies the property data to be written in the temporal storage means based on the proceeding of the game that varies in accord with the operation of the operation means. The game program storage means stores a program set to vary an appearance condition of the monster which appears at a given place on the game map based on time information of the clock means. The stored program is processed by the processing means, thereby varying the appearance condition of the monster based on the time information.

As to the appearance condition of the monster, the program may be set so that the probability in the time zone based on the time information is distributed in a predetermined manner such as a normal distribution curve.

As to the appearance condition of the monster, the program may be set so that the appearing location varies depending on the time zone based on the time kept by the clock means.

If the characters are imaginary creatures that are distinguishable by sex, the program in the game program storage means may be set so that, when the same type creatures having different sex are coupled and kept in the same region, a child inheriting the properties of the both sexes of the creature type is born based on the elapse of a predetermined time.

Furthermore, in the present invention, the game cartridge detachably connected to the portable game machine includes the program storage means for storing the game program and the readable/writable temporal storage means for storing the plurality of property data items for each of the characters obtained in the course of playing the game. The temporal storage means includes a region storing the plurality of property data items for each of the obtained characters and a virus-infection data region for storing whether each character is infected with a virus that accelerates its growth. The portable game machine (main body) includes the operation means operated by the player for performing operation for at least obtaining the character and training the character to increase its experience points, the processing means, and the display means for displaying the result of processing performed by the processing means. The processing means, by executing the program and following the operation of the operation means, performs the image processing as to vary the image on the display. The processing means also varies the property data to be written in the temporal storage means in accord with the proceeding of the game that varies based on the operation of the operation means, and varies the character image based on the varied property data. Furthermore, when a newly captured character has data that indicates virus infection, the processing means writes the data into at least one of the virus-infection data regions provided for each of the other captured characters being stored in the temporal storage means.

The image-display game machine is so structured as to become connectable with other image-display game machines by a data cable. When exchanging data between the other image-display game machine and receiving the virus-infected character therefrom, the processing means in the image-display game machine writes, based on the program stored in the program storage means, the data indicating virus infection into at least one of the virus-infection data regions provided for each of the other captured characters being stored in the temporal storage means.

Still further, in the present invention, an image-display game system includes an information storage medium storing a game program and an image-display game machine so structured that the information storage medium is detachably connected thereto. The information storage medium includes program storage means for fixedly storing the game program, and readable/writable temporal storage means for storing a plurality of property data items including sex data for each of characters obtained in the course of playing the game. The image-display game machine includes operation means operated by a player, processing means for processing information based on the operation status of the operation means and the program, and display means for displaying the result of processing performed by the processing means. The processing means, by executing the program and following the operation of the operation means, performs image processing as to vary the image on the display. The processing means also varies the property data to be written in the temporal storage means in accord with the proceeding of the game, and writes the sex data of the captured character to the temporal storage means.

As described above, in the present invention, the time-varying factor is introduced to further diversify the contents of the game and increase the appeal of the game, thereby achieving the image-display game machine, and the information storage medium storing the game program therefor, that is challenging for the user.

Further, according to the present invention, the image-display game machine and the information storage medium storing the game program therefor that provides more fun are obtained by changing the property data of the characters such as the monsters based on the, thus introduced, time-varying factor to further diversify the developments in the game depending on a player's knowledge and thinking.

While the invention has been described in detail, the foregoing description is in all aspects illustrative and not restrictive. It is understood that numerous other modifications and variations can be devised without departing from the scope of the invention.

What is claimed is:

1. A game machine for executing a game program of a type having an associated display wherein a player object is moved within a displayed territory to encounter a character, comprising:

a program storage for storing a game program;

a clock for generating time related information;

an operation control member actuated by a player for controlling the display of a player object; and a processor for executing said program to vary a displayed image based on the operation of said operation control member, wherein said game program storage stores a program for evaluating a time related criteria using said time related information, and for varying the likelihood for a character to appear on the game display in a portion of said territory based at least in part on the evaluation of said time related criteria.

2. The game machine as claimed in claim 1, wherein said game program storage stores a program in which the likelihood for a character to appear on the game display is set at a predetermined probability based on the evaluation of said time related criteria.

3. The game machine as claimed in claim 1, wherein said territory is represented by a displayed map and wherein said game program storage stores a program in which a type of the character appearing at a location on the game map is set to vary depending on a time range based on the time related information from said clock.

4. The game machine as claimed in claim 2, further comprising:

a first random number generator for generating a first random number;

a first comparator for comparing data related to the likelihood of a character appearing with said first random number; and wherein said processor is operable to perform character appearance processing when said data related to the likelihood of a character appearing has a predetermined relationship with said first random number.

5. The game machine as claimed in claim 4, further comprising:

a second random number generator for generating a second random number;

a second comparator for comparing a plurality of character pointers each indicating a different value with said second random number; and wherein said processor is operable to control the display of a character indicated by any of the character pointers having a predetermined relationship with said second random number.

6. The game machine as claimed in claim 1, wherein said character is an imaginary creature distinguishable by sex, and said game program storage stores a program in which, when the same type creatures having different sex are coupled and kept in a same region in said territory, and in which a child inheriting properties of the both sexes of the creature type is set to be born after a predetermined elapsed time.

7. A storage medium in which a game program is stored for controlling a game machine having an associated display, wherein a player object is moved within a territory to encounter a character, said game program controlling said game machine to perform the operations comprising the steps of:

generating time related information;

detecting operation of a control member by a player to control movement of the player object;

varying a displayed image based on said detected movement of the player object;

evaluating a time-related criteria using said time related information;

varying the likelihood for a character to appear on the game display in a portion of the territory based at least in part on the evaluation of said time-related criteria.

8. A method of operating a game machine having an associated display wherein a player object is moved within a territory to encounter a character, comprising the steps of:

generating time related information;

controlling movement of the player object in response to actuation of an operation control member;

varying a displayed image based on detected movement of the player object;

evaluating a time-related criteria using said time related information;

varying the likelihood for a character to appear on the game display in a portion of the territory based at least in part on the evaluation of said time-related criteria.

9. A method according to claim 8, wherein said step of varying the likelihood includes the step of storing data relating to a predetermined probability based on the time related information.

10. A method according to claim 8, wherein said territory is represented by a displayed map and further including the step of storing data relating to the type of character appearing at a location on the game map to vary based on the time related information.

11. A method according to claim 8, further including the steps of generating a first random number;

comparing data related to the likelihood of a character appearing with said first random number; and displaying said character when said data related to the likelihood of a character appearing has a predetermined relationship with said first random number.

12. A method according to claim 11, further including the steps of generating a second random number;

comparing a plurality of character pointers each indicating a different value with said second random number; and controlling the display on said game map of a character indicated by any of the character pointers having a predetermined relationship with said second random number.

13. A method according to claim 8, wherein said character is an imaginary creature distinguishable by sex, and further including the steps of associating a pair of same type creatures having different sex, keeping said pair in a same region of said game map, storing data relating to a child of said pair inheriting properties of the both sexes of the creature type of said pair; and scheduling said child to be born based on a predetermined elapsed time.

* * * * *